United States Patent
Kouno et al.

(10) Patent No.: US 8,098,454 B2
(45) Date of Patent: Jan. 17, 2012

(54) MANUFACTURING METHOD OF HERMETIC CONNECTION TERMINAL USED IN A DISK DRIVE DEVICE HAVING HERMETICALLY SEALED ENCLOSURE AND DISK DRIVE DEVICE

(75) Inventors: Takashi Kouno, Ibaraki (JP); Akihiko Aoyagi, Kanagawa (JP); Kazuhide Ichikawa, Kanagawa (JP); Teruhiro Nakamiya, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 560 days.

(21) Appl. No.: 12/313,615

(22) Filed: Nov. 21, 2008

(65) Prior Publication Data

US 2009/0168233 A1 Jul. 2, 2009

(30) Foreign Application Priority Data

Dec. 26, 2007 (JP) ................... 2007-333637

(51) Int. Cl.
*G11B 17/02* (2006.01)
(52) U.S. Cl. ............... 360/97.02; 360/97.01; 360/97.03; 360/97.04

(58) Field of Classification Search ............... 360/97.01, 360/97.02, 97.03, 97.04
See application file for complete search history.

(56) References Cited

U.S. PATENT DOCUMENTS

2005/0068666 A1 * 3/2005 Albrecht et al. ............ 360/97.02

FOREIGN PATENT DOCUMENTS

| JP | 06-089751 | 3/1994 |
|---|---|---|
| JP | 06-260230 | 9/1994 |
| JP | 2001-160442 | 6/2001 |
| JP | 2006-332114 | 12/2006 |
| JP | 2007-200811 | 8/2007 |
| JP | 2007-250805 | 9/2007 |

* cited by examiner

Primary Examiner — Thong Q Le

(57) ABSTRACT

To efficiently manufacture a feedthrough used in a disk drive device having a hermetically sealed enclosure, embodiments of the present invention manufacture a feedthrough used in an HDD having a hermetically sealed enclosure. An embodiment of a manufacturing method of the present embodiment manufactures a columnar body, cuts the columnar body in the direction vertical to the axes of pins, and cuts out a feedthrough. Then, necessary plating is made on the outer surfaces of the cut out feedthrough. The columnar body comprises a hollow tube, a plurality of pins inserted inside the tube, and an insulating sealant filled inside the tube. This manufacturing method achieves efficient manufacture of the feedthrough.

9 Claims, 8 Drawing Sheets

MANUFACTURING METHOD OF HERMETIC CONNECTION TERMINAL USED IN A DISK DRIVE DEVICE HAVING HERMETICALLY SEALED ENCLOSURE AND DISK DRIVE DEVICE

CROSS-REFERENCE TO RELATED APPLICATION

The instant nonprovisional patent application claims priority to Japanese Patent Application No. 2007-333637, filed Dec. 26, 2007 and incorporated by reference in its entirety herein for all purposes.

BACKGROUND OF THE INVENTION

Hard disk drives (HDDs) rotate magnetic disks and drive head gimbal assemblies (hereinafter referred to as HGAs) at high speed, in response to requests for large capacity, high recording density, and high-speed accessing. Rotation at such high speeds can cause fluctuation of air (turbulence) to buffet the magnetic disks and HGAs. This turbulence buffeting can disturb positioning a head on a magnetic disk. This is because the turbulence occurs at random and it is difficult to estimate its magnitude and cycle so that swift and accurate positioning control of the recording and reproducing head will be complex and difficult. Also, the turbulence buffeting may cause a noise to impair the quietness of the device.

Another problem caused by influence of the air within the device due to the high speed rotation other than the foregoing is increase in electric power consumption. When a magnetic disk is rotated at high speed, the air around the disk is dragged and rotated together. On the other hand, the air apart from the magnetic disk remains still, so that shearing force arises therebetween to become a load against the rotation of the disk. This is called as a windage loss, which becomes larger as the disk rotates at higher speed. In order to rotate the disk at high speed against the windage loss, a motor will require a larger output and electric power.

As the above-described turbulence and windage loss are proportional to the density of the gas within the device, there is an idea to reduce the turbulence and windage loss by enclosing low density gas instead of air in a hermetically sealed HDD. Hydrogen, helium, and the like are exemplified as the low density gas, but helium is optimum because it is effective, stable, and safe in considering actual use. HDDs with sealed helium gas may overcome the above-described problems and accomplish swift and accurate positioning control, electric power saving, and satisfactory quietness.

However, molecules of helium are extremely small and a diffusion coefficient of helium is large. Therefore, there has been a problem that enclosures used in usual HDDs are poorly sealed so that helium gas leaks easily during normal use.

In order to make it possible to hermetically seal low density gas like helium gas, a technique disclosed in U.S. Patent Application Publication No. 2005/0068666 "Patent Document 1") has been suggested. Patent Document 1 discloses a magnetic disk device in which a hermetic connection terminal (feedthrough) for connecting an FPC assembly inside the enclosure and a circuit board outside the enclosure is attached to an opening of the base and the enclosure is hermetically sealed by a cover. With respect to the joint of the base and the cover which is a section for the helium inside the enclosure to be likely to leak therethrough, the aluminum die-casted base and the aluminum cover are laser-welded so as to securely seal the joint.

With respect to the attaching section of the feedthrough, which is another section through which the helium inside the enclosure is likely to leak, the feedthrough is constituted by a header and a plurality of pins secured to the header with insulating sealants of glass or the like, and the header is soldered to the rim of the opening on the bottom of the base so as to completely seal the attaching section.

In addition, many structures for making a terminal airtight have been known. Japanese Unexamined Patent Application Publication No. 2007-250805 ("Patent Document 2") discloses an example of a surface mounting hermetic terminal.

As described above, a conventional feedthrough used in a hermetically sealed HDD comprises a plurality pins secured to a head with insulating sealants like glass and projecting largely out from the header upward and downward. These pins protrude from the bottom of the device, and have thin shapes and small rigidity. Therefore, in handling the feedthrough in manufacturing an HDD, an inadvertent force or shock is occasionally applied to the pins to bend them or damage the rim sealants. A bended pin reduces the reliability of the device because it may raise contact failure with a connector. A damaged insulating sealant reduces the reliability of the device as well because it may cause helium to leak. Particularly, an excessive force may be applied to the pins in a connecting step of the feedthrough and connectors inside and outside of the HDD; it has been afraid that the manufacturing efficiency, the yield, and the reliability of the HDD may be reduced.

For a hermetic terminal to be used in surface mounting like the hermetic terminal disclosed in the Patent Document 2, a hermetic terminal in which the end face of a conducting part to transmit signals is flush with the surface of its main body has been known. Such a terminal structure may prevent the pins or the rim sealants from being damaged due to an external force to the pins since the pins do not largely protrude from the header.

However, the hermetic terminal disclosed in the Patent Document 2 has a structure asymmetrical to the direction of the axes of the pins, which has been a factor to interfere with efficient manufacture of the hermetic terminal. Consequently, an efficient manufacturing method of a feedthrough to be used in an HDD having a sealed enclosure is desired. The connection between the hermetic terminal and terminals inside and outside of the enclosure is made by wire bonding or conductive joining materials so that high airtightness cannot be expected and it is difficult to apply such a terminal structure to a feedthrough for a hermetically sealed HDD.

Accordingly, a technique is demanded for using a feedthrough easy in manufacture and handling and assuring easy and secure conductance between the feedthrough and the corresponding connectors.

BRIEF SUMMARY OF THE INVENTION

Embodiments of the present invention relate to a feedthrough used in a disk drive device having a hermetically sealed enclosure. FIG. 7 shows an embodiment of manufacture of a feedthrough 160 used in a HDD having a hermetically sealed enclosure. The method manufactures a columnar body 701, cuts the columnar body 701 in the direction vertical to the axes of pins 712, and cuts out a feedthrough 160. Then, necessary plating is made on the outer surfaces of the cut out feedthrough 160. The columnar body 701 comprises a hollow tube 711, a plurality of pins 712 inserted inside the tube 711, and an insulating sealant 713 filled inside the tube 711. This manufacturing method achieves efficient manufacture of the feedthrough 160.

DETAILED DESCRIPTION OF THE INVENTION

Figure 1:
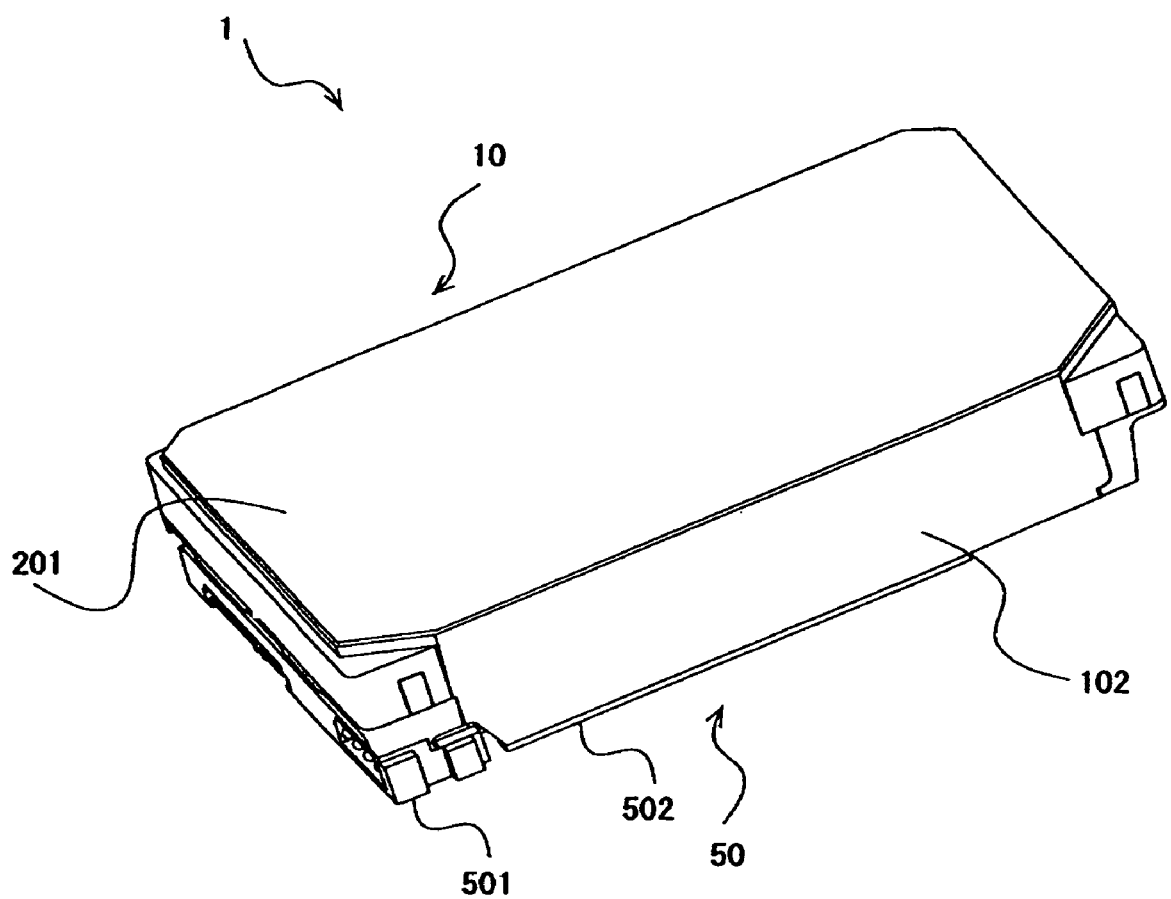
FIG. 1 is an exemplary perspective view schematically depicting the configuration of a hermetically sealed HDD in an embodiment.

Embodiments of the present invention relate to a manufacturing method of a hermetic connection terminal used in a disk drive device having a hermetically sealed enclosure, and a disk drive device having a hermetically sealed enclosure.

An aspect of embodiments of the present invention is a manufacturing method of a hermetic connection terminal used in a disk drive device having a hermetically sealed enclosure. According to an embodiment, this method puts an insulating sealant in a through hole in the direction of an axis of a header which is made of a metal and long in the axis direction. It inserts a conductive pin into the hole in the direction where the hole extends. It insulates and secures the conductive pin by the insulating sealant to form a columnar body. It cuts the columnar body in the direction crossing the axis direction of the conductive pin to cut out a plurality of hermetic connection terminals. This accomplishes effective manufacture of a hermetic connection terminal.

In addition, the method may plate an outer surface of the hermetic connection terminal after cutting out the hermetic connection terminal. This improves contact characteristic of hermetic connection terminal and reliability by corrosion.

The method may plate the header and the conductive pin with the same material. This accomplishes efficient plating.

The header may include at least two holes and an insulating sealant insulate and secure a conductive pin in each of the holes. This accomplishes more efficient manufacture of the hermetic connection terminal.

An embodiment of a disk drive device according to an aspect of the present invention comprises a hermetically sealed enclosure, a disk mounted on the enclosure, a head for accessing the disk, a moving mechanism for supporting the head and moving the head above the disk, and a hermetic connection terminal joined to the enclosure. The hermetic connection terminal comprises a header formed of a metal having a hole, an insulating sealant formed in the hole, a conductive pin insulated and secured in the insulating sealant. The levels of the both exposed end surfaces of the conductive pin are even with the levels of the both end surfaces of the header, respectively, and cross-sectional shapes in the axis direction of the conductive pin is the same, and the disk drive device further comprises a connector having a spring terminal in contact with either of the exposed surfaces of the conductive pin. This reduces the possibility of damage of the hermetic connection terminal and accomplishes secure electric connection with ease.

A plurality of pins may be insulated from each other by the insulating sealant be secured in a single hole of the header. This accomplishes more efficient manufacture of a hermetic connection terminal.

According to embodiments of the present invention, a hermetic connection terminal used in a disk drive device having a hermetically sealed enclosure may be efficiently manufactured. In this connection, the possibility of a break in the hermetic connection terminal used in a disk drive device having a hermetically sealed enclosure may be reduced.

Hereinafter, one embodiment of the present invention will be described. For clarity of explanation, the following description and the accompanying drawings contain omissions and simplifications as appropriate. Throughout the drawings, like components are denoted by like reference numerals, and their repetitive description is omitted if not necessary for clarity of explanation. In this embodiment, descriptions will be given on a hard disk drive (HDD) as an example of a disk drive device. An HDD according to embodiments comprises a hermetically sealed enclosure; low density gas is enclosed inside the enclosure. A feature of certain embodiments is a feedthrough of a hermetic connection terminal joined to a base of the HDD, and in particular, a technique of electric connection between a feedthrough having a specific structure and connectors and a manufacturing method of the feedthrough.

First, configuration of an HDD 1 according to an embodiment will be described. FIG. 1 is a perspective view schematically depicting the configuration of a hermetically sealed HDD 1 according to an embodiment. The HDD 1 comprises a head disk assembly (HDA) 10 and a control circuit board 50 fixed to the outer bottom of the HDA 10. The control circuit board 50 has an interface connector 501 to an external host and a circuit board 502 on which the interface connector 501 and various ICs are mounted. An HDA 10 comprises a base 102 and a top cover 201. Components, such as heads and disks, are housed in the interior space formed by the base 102 and the top cover 201.

Figure 2:
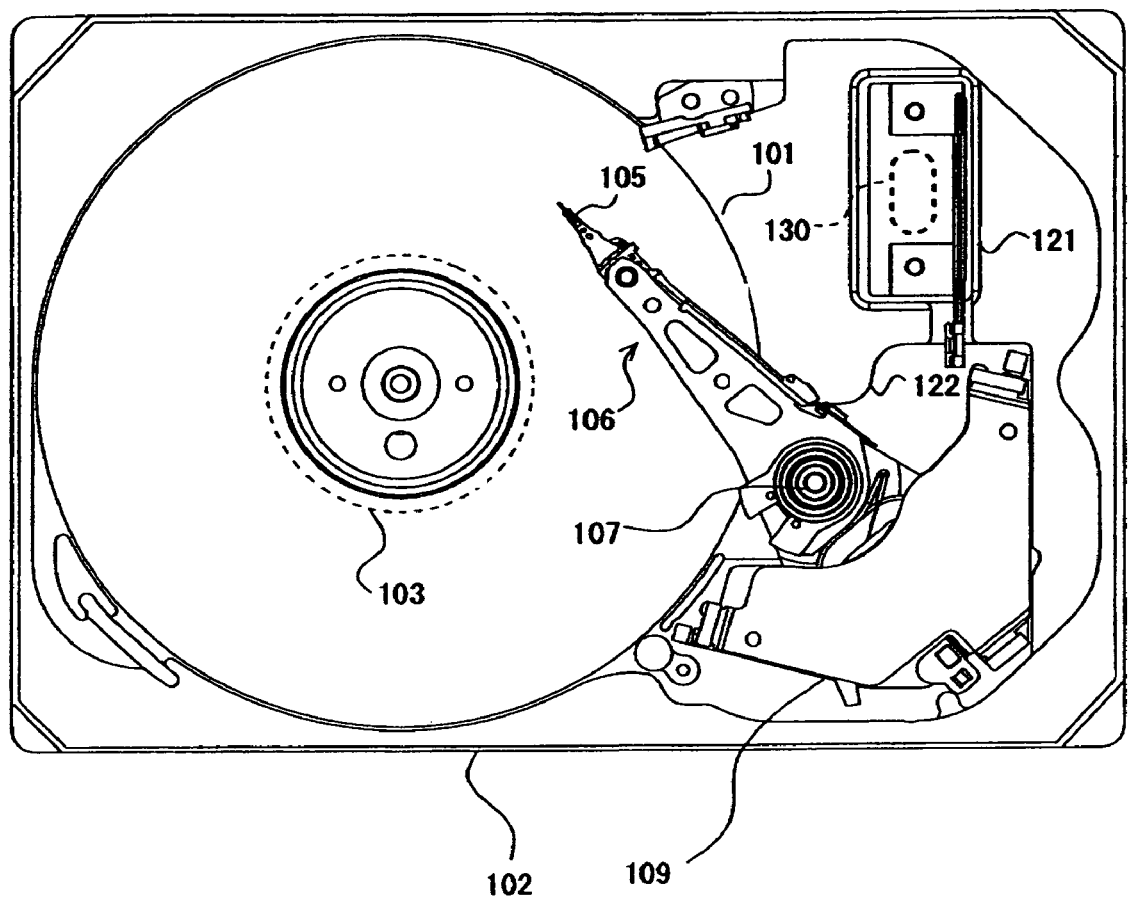
FIG. 2 is an exemplary top view schematically depicting the structure within the housing space of the HDD in an embodiment.

Operation of the components inside the enclosure shown in FIG. 2 is controlled by a control circuit on the control circuit board 50. FIG. 2 is a top view showing the internal structure of the hermetically sealed HDD 1. A magnetic head 105, an example of a head, writes to and/or read from a magnetic disk 101 for magnetic information. An actuator 106 of a moving mechanism of the magnetic head 105 supports and moves the magnetic head 105. The actuator 106 is supported pivotably about a pivotal shaft 107, comprises a voice coil motor (VCM) 109, and is driven by the VCM 109.

A magnetic disk 101 is held and is rotated at a specific angular rate by a spindle motor (SPM) 103 fixed to the base 102. The actuator 106 moves the magnetic head 105 to a given disk position above the rotating magnetic disk 101, and the magnetic head 105 retrieves or writes necessary data on the magnetic disk 101.

Signals between the control circuit on the control circuit board 50 and the magnetic head 105, driving power from the control circuit to the VCM 109, and driving power from the control circuit to the SPM 103 are transmitted through a flexible printed circuit (FPC) 122 and an FPC connector 121.

The FPC 122 and the FPC connector 121 are signal transmission wirings in the base 102. The FPC 121 is connected to a feedthrough 130, which is joined to the bottom of the base 102 and connects the FPC connector 121 and the control circuit board 50 electrically. This embodiment has features in the structures of the feedthrough 130 and the FPC connector 121, which will be described in detail later.

Returning to FIG. 1, the enclosure of the HDA 10 according to the embodiment comprises a base 102 for housing the above-described components and a top cover 201 to close a top opening of the base 102. In the HDD 1 according to the embodiment, low density gas which has lower density than air is sealed in the housing space. Although hydrogen or helium is an example of the low density gas to be used, helium is optimum because it is much effective, stable, and safe. Therefore, an example where helium is used will be described hereinafter.

In manufacturing steps of an HDD 1, a base 102 is first manufactured by die-casting or cutting and then an opening is made on the bottom of the base 102. Next, a feedthrough 130 is hermetically joined so as to close the opening with solder or bond such as adhesive. Then, an actuator 106, a magnetic head 105, an SPM 103, a magnetic disk 101, and the like are mounted within the base 102 to which the feedthrough 130 has been joined, and then the top cover 201 is secured to the base 102. Typically, the top cover 201 is secured to the base 102 by means of laser-welding or soldering. Thereby, the housing space 213 constituted by the top cover 201 and the base has become a completely sealed space and helium gas is enclosed in the housing space 213. Finally, the control circuit board 50 is mounted to the HDA 10 to finish the HDD 1.

In this connection, when the laser-welding or soldering is used in securing the top cover 201, the materials of the base 102 and the top cover 201 should be selected in view of their durability, reliability, and cost. For example, it is preferable to select either set of the base 102 formed by aluminum die-casting and an aluminum top cover 201 formed by pressing or cutting, or a base 102 formed by cold forging from an aluminum alloy whose contents of copper and magnesium are relatively small and an aluminum top cover 201 formed by pressing or cutting.

Figure 3:
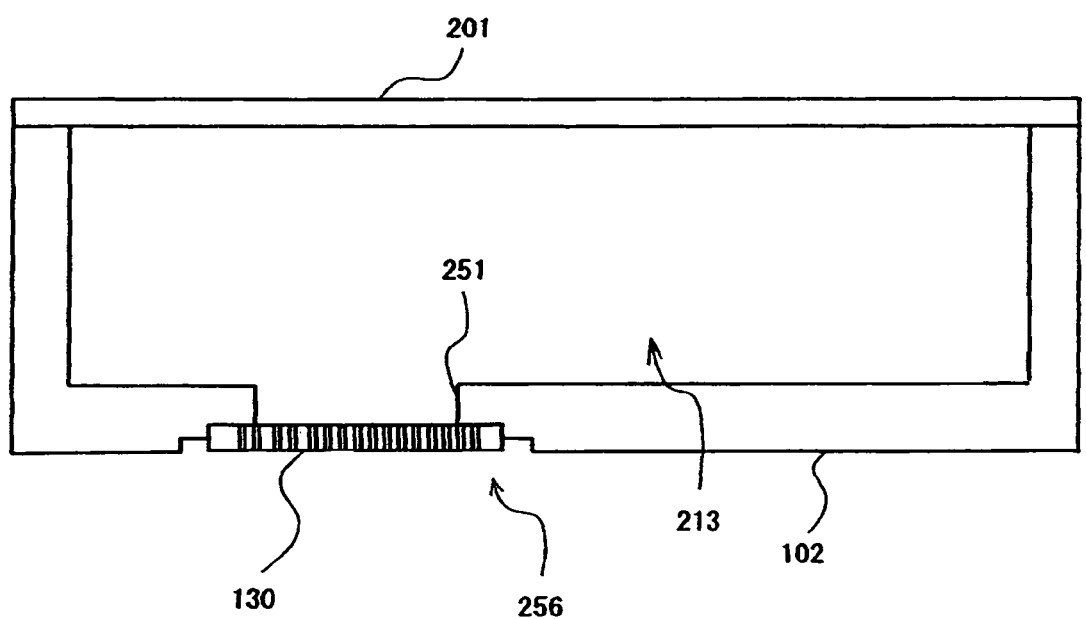
FIG. 3 is an exemplary cross-sectional view schematically depicting a base, a top cover and a feedthrough joined to the bottom of the base in an embodiment.

FIG. 3 is a cross-sectional view schematically depicting the base 102, the top cover 201, and the feedthrough 130 joined to the bottom of the base 102. As shown in FIG. 2, the feedthrough 130 is set close to the FPC connector 121 on the bottom of the base. In FIG. 3, each component within the interior space 213 is omitted. The base 102 has an opening 251 of a through-hole on its bottom and the feedthrough 130 is placed so as to close the opening 251.

The feedthrough 130 is placed in a depressed part 256 formed on the outer bottom surface of the base 102. Since the hermetically sealed HDD requires the enclosed helium of low density gas to be retained, high airtight performance is demanded in joining the feedthrough 130 and the base 102. Therefore, the space between the feedthrough 130 and the base 102 is sealed by soldering. If airtightness is assured, the feedthrough 130 and the base 102 may be secured by another method. Hereinafter, an example of joining by solder will be described.

Hereinafter, the structure of the feedthrough 130 according to an embodiment will be described. FIG. 4(a) is a perspective view schematically depicting the structure of the feedthrough 130 of an embodiment. FIG. 4(b) is a cross-sectional view along the B-B sectional line of FIG. 4(a), and FIG. 4(c) is an exploded view of the cross-section. The feedthrough 130 comprises a header 301, pins 302 inserted in through-holes 311 of the header 301, insulating sealants 303 formed around the pins 302 in through-holes 311 of the header 301. The header comprises a plurality of through-holes 311; a pin 302 and an insulating sealant 303 are present in each through-hole 311.

The header 301 is a plate-like member and formed of a metal. Typically, the header 301 comprises a mother body made of a metal mainly composed of iron such as stainless steel (SUS) or a cold-reduced carbon steel sheet (SPCC) and a metallic thin film plated on the outer surface of the mother body. The plated layer is made of a metal having higher corrosion resistance and solder wettability than the material of the inner mother body. An example of a plating material is nickel or gold.

The header 301 comprises an oval top plate 312 and an oval bottom plate 313. Their shapes are not particularly limited. Either the top plate 312 or the bottom plate 313 is exposed inside the base 102 of an HDD 1 and the other is exposed to the external. The top plate 312 and the bottom plate 313 are parallel to each other and have the same shape. In the direction of the thickness defined between the top plate 312 and the bottom plate 313 (the top-bottom direction in FIG. 4), the shapes of the cross-sections of the header 301 are the same. The header 301 comprises a plurality of holes 311 to penetrate from the top plate 312 to the bottom plate 313. The direction of penetration of the plurality of holes 311 is vertical to the top plate 312 and the bottom plate 313. The shapes of the holes 311 viewed from the top plate 312 and the bottom plate 313 are circles but they are not particularly limited.

Figure 4:
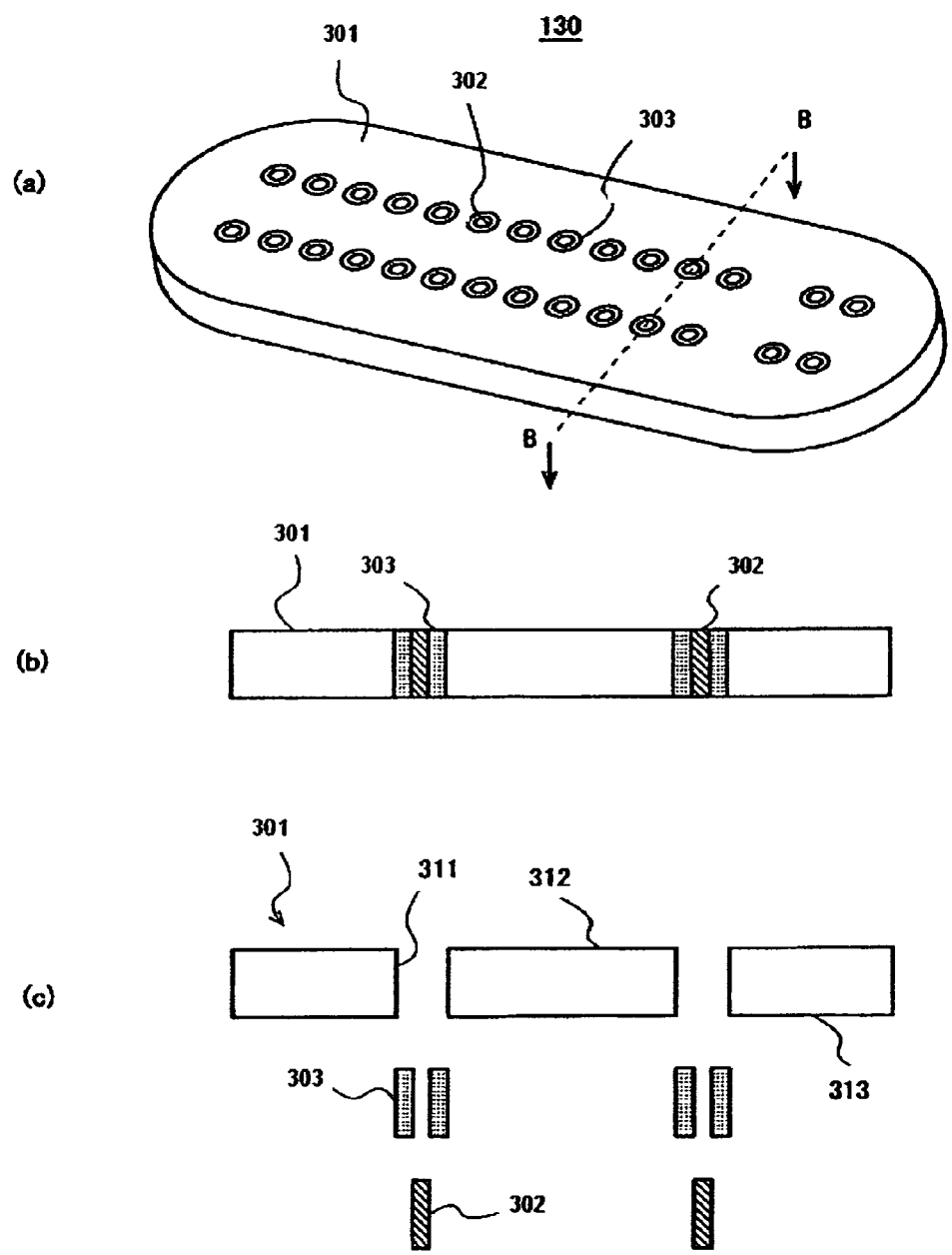
FIG. 4 are exemplary diagrams depicting the structure of the feedthrough in an embodiment.

Each pin 302 penetrates each of the holes 311 of the header 301. In the structure of FIG. 4, a single pin 302 is secured in a hole, which achieves reduction in the area of an insulating sealant 303 in each hole 311 to reduce the possibility of a break in the insulating sealant 303. The pin 302 is a component for signal transmission between the control circuit and the magnetic head 105 and power transmission to the VCM 109 and the SPM 103 and is made of a conductor. Each hole 311 around a pin 302 is filled with an insulating sealant 303 so that the pin is secured in the hole 311 with the insulating sealant 303 and insulated from the header 301. Further, the insulating sealant 303 hermetically seals the space between the pin 302 and the header 301. Typically the insulating sealant 303 is made of glass material.

Each pin 302 is secured in the center of each hole 311 and extends vertically to the top plate 312 and the bottom plate 313 of the header 301 in the direction of its axis (the direction of penetration). As shown in the cross-sectional view of FIG. 4(b), the levels of the top and bottom end surfaces of each pin 302 are even with the levels of the top surface of the top plate 312 and the bottom surface of the bottom plate 313 of the header 301, respectively. Similarly, the levels of the top and bottom end surfaces of each insulating sealant 303 are even with the levels of the top surface of the top plate 312 and the bottom surface of the bottom plate 313 of the header 301, respectively.

Accordingly, the levels of the top surface of the top plate 312 of the header 301 is even with the levels of the exposed surfaces of each pin 302 and each insulating sealant 303, so that the top surface of the feedthrough 130 is so-called flush. Similarly, the levels of the bottom surface of the bottom plate 313 of the header 301 is even with the levels of the exposed surfaces of each pin 302 and each insulating sealant 303, so that the bottom surface of the feedthrough 130 is so-called flush. Since the pins 302 do not projected from the header 301, the risk that the pins 302 or the insulating sealants 303 are broken due to a big load applied to the pins 302 is extremely small.

The mother bodies of pins 302 may be made of the material having a thermal expansion coefficient close to the one of insulating sealants 303, for example, a 52 alloy or kovar. Small difference in thermal expansion coefficient may reduce the stress to insulating sealants 303 to prevent delamination fracture of the insulating sealants due to thermal stress. For the purpose of corrosion resistance, the parts of the pins 302 exposed to the outside in the top plate 312 and the bottom plate 313 of the header 301 may be plated. This will be described later.

The cross-sectional shapes of the pins 302 are the same at any position in the direction of their axes. As described above, since the cross-sectional shapes of the header 301 in the direction of the axes of the pins 302 are the same, the cross-sectional shapes of the feedthrough 130 in the direction of the axis of the pin 302 are the same. This shape of the feedthrough 130 accomplishes efficient manufacture of the feedthrough 130. This will be described later.

Figure 5:
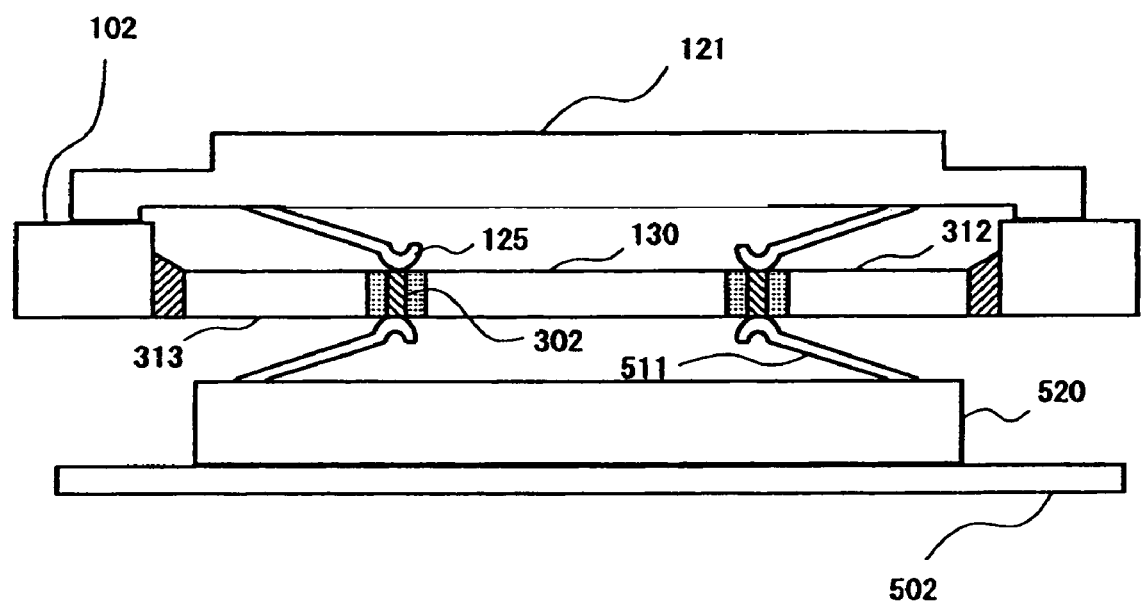
FIG. 5 is an exemplary diagram schematically illustrating the connection between the feedthrough and a connector in an embodiment.

FIG. 5 is a cross-sectional view schematically illustrating connection of the feedthrough 130 according to the present embodiment and the corresponding connectors. The feedthrough 130 is connected to an FPC connector 121 inside the enclosure and an external connector 520 on the circuit board 502 outside the enclosure. Since the feedthrough 130 according to the present embodiment does not have projecting pins, a female connector cannot be used for the connection.

Then, the FPC connector 121 and the external connector 520 have spring terminals 125 and 511, respectively. Although FIG. 5 exemplifies two each spring terminals for the FPC connector 121 and the external connector 520, the FPC connector 121 and the external connector 520 have spring terminals each of which contacts each pin 302 of the feedthrough 130.

The spring terminals 125 and 511 each contact the exposed surfaces of the pins 302 to assure electric conductivity. The spring terminals 125 and 511 have spring characteristics in the direction toward the corresponding pins 302 and press the exposed surface of the pins 302 in contact. This achieves secure contact between the spring terminals 125 and 511 and the exposed surfaces of the pins 302. Although the pins 302 contact the spring terminals 125 and 511, they are not inserted in and taken out from the holes like the conventional connecting part so that tolerance to rubbing movement is not necessary so much. Therefore, the plating of the exposed surfaces of pins 302 may be a metallic material other than gold; for example, nickel may be used.

Figure 6:
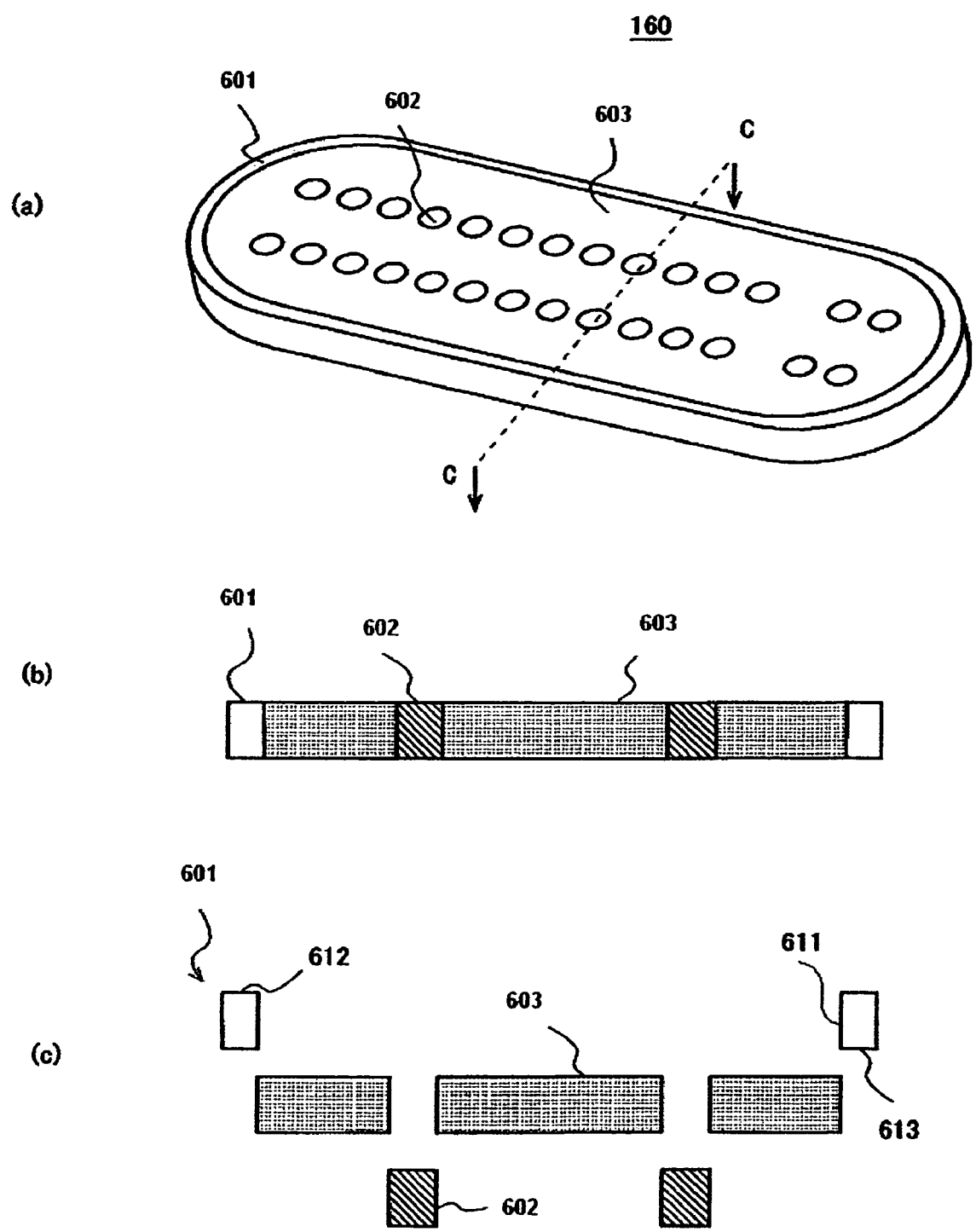
FIG. 6 are exemplary diagrams schematically depicting a feedthrough according to another aspect of an embodiment.

FIG. 6 depicts a shape of a feedthrough 160 according to another aspect of embodiments of the present invention. FIG. 6(a) is a perspective view schematically depicting the structure of the feedthrough 160. FIG. 6(b) is a cross-sectional view along the C-C sectional line of FIG. 6(a), and FIG. 6(c) is an exploded view of the cross-section. The main difference between the feedthrough 130 in the other aspect explained in reference to FIG. 4 is that a header 601 of the feedthrough 160 is an annular component and have a single hole 611. A plurality of pins 602 are inserted in the hole 611 of the header 601. All the pins 602 of the feedthrough 160 are secured in the hole 611.

In the hole 611, an insulating sealant 603 is filled in around the pins 602; the pins 602 and the header 601 are discretely located and electrically insulated from each other. The insulating sealant 603 is placed between the pins 602 and between the pins 602 and the header 601 to secure the pins 602 inside the hole 611, electrically insulates a pin 602 from another, and pins 602 from the header 601, and seals the space between the pins 602 and the header 601. Since no part of the header 601 is between the pins 602, the cross section of a pin 602 in the direction of its axis may be enlarged more than the one of the pin 302 of the feedthrough 130 in the above example.

The materials of the header 601, pins 602, and the insulating sealant 603 are the same as the other feedthrough 130. The plating on the surfaces of the header 601 and the pins 602 are the same as well. The header 601 of FIG. 6 is an oval annulus but may be a circular or rectangular annulus. Either a top plate 612 or a bottom plate 613 of the header 601 is exposed inside the base 102 of an HDD 1 and the other is exposed to the external. The top plate 612 and the bottom plate 613 are parallel to each other and have the same shape. In the direction of the thickness defined between the top plate 612 and the bottom plate 613 (the top-bottom direction in FIG. 6), the shapes of the cross-sections of the header 601 are the same. The direction of penetration of the hole 611 is vertical to the top plate 612 and the bottom plate 613.

The pins 602 are secured in the hole 611 and extend vertically to the top plate 612 and the bottom plate 613 of the header 601 in the direction of their axis (the direction of penetration). As shown in the cross-sectional view of FIG. 6(b), the levels of the top and bottom end surfaces of the pins 602 are even with the levels of the top surface of the top plate 612 and the bottom surface of the bottom plate 613 of the header 601, respectively. Similarly, the levels of the top and bottom end surfaces of the insulating sealant 603 are even with the levels of the top surface of the top plate 612 and the bottom surface of the bottom plate 613, respectively.

The level of the top surface of the top plate 612 of the header 601 is even with the levels of the exposed surfaces of each pin 602 and the insulating sealant 603, so that the top surface of the feedthrough 160 is so-called flush. It is the same as the bottom surface of the feedthrough 160 as well. The cross-sectional shapes of the pins 602 are the same at any position in the direction of their axes. As described above, since the cross-sectional shapes of the header 601 in the direction of the axes of the pins 602 are the same, the cross-sectional shapes of the feedthrough 160 in the direction of the axes of the pins 602 are the same. This shape of the feedthrough 160 accomplishes efficient manufacture of the feedthrough 160.

Figure 7:
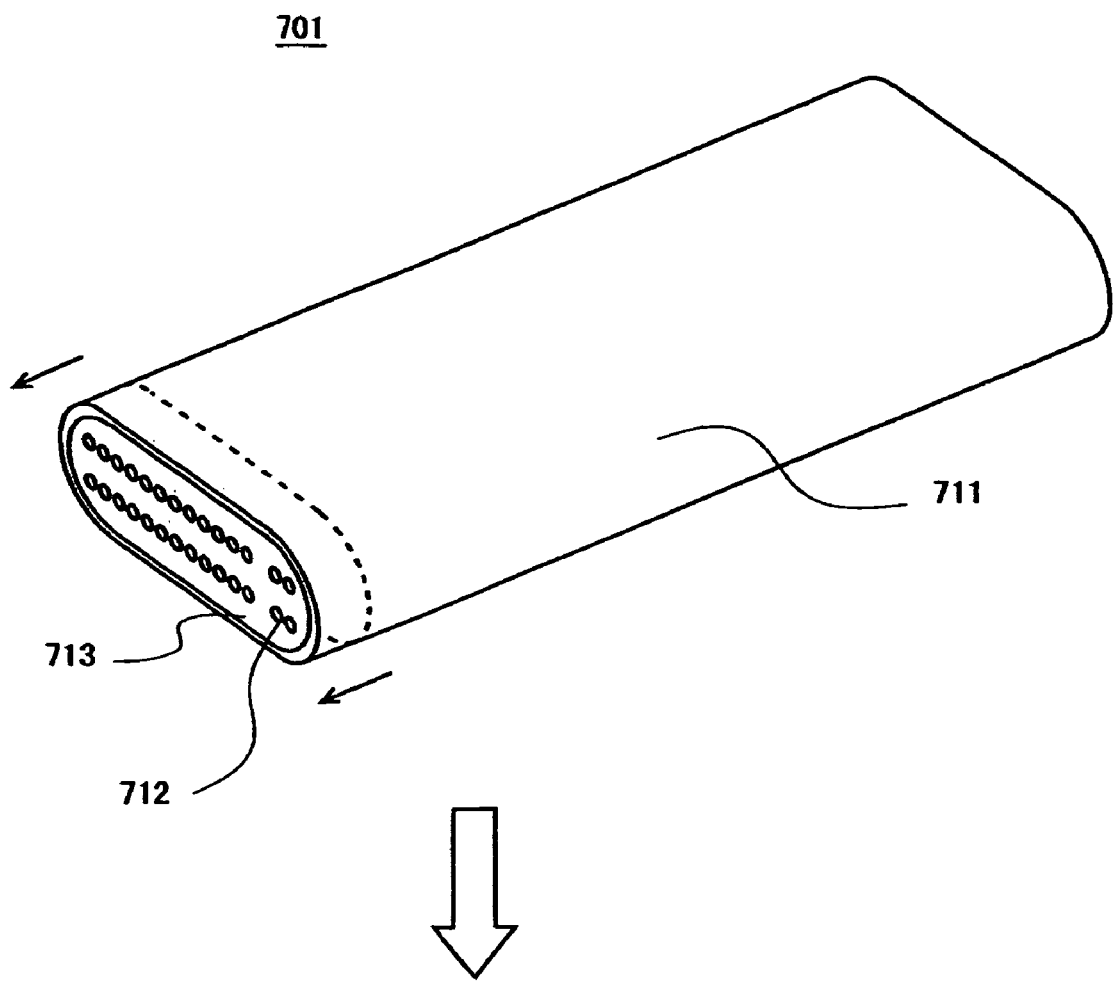
FIG. 7 is an exemplary diagram schematically illustrating a manufacturing method of a feedthrough in an embodiment.
Figure 7:
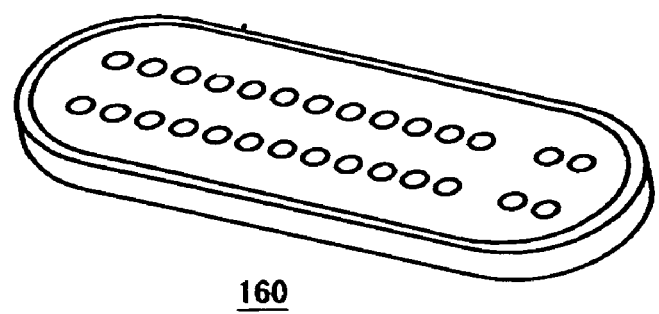

Hereinafter, an embodiment of a manufacturing method of feedthroughs 130 and 160 will be described. As shown in FIG. 7, the manufacturing method of a feedthrough according to an embodiment first manufactures a columnar body 701 and cuts out feedthroughs from the columnar body 701 to manufacture a plurality of feedthroughs from the columnar body 701. Although FIG. 7 illustrates a feedthrough 160 of the second aspect, a feedthrough 130 of the first aspect may be manufactured in the same way.

The columnar body 701 comprises a hollow tube 711, a plurality of pins 712 inserted in the tube 711, and an insulating sealant 713 filled in the tube 711. The tube 711 corresponds to the header 601 and is made of the same material as the mother body of the header 601. The insulating sealant 713 is made of the same material as the insulating sealant 603 and the plurality of pins 712 corresponds to a plurality of pins 602.

The method cuts the columnar body 701 in the direction vertical to the axes of the pins 712 to cut out a feedthrough 160. Further, it plates the outer surface of the cut out feedthrough 160 as necessary. On the cut surface of the feedthrough 160, the materials of the mother bodies of the header 601 and the pins 602 are exposed. In the above example, the material is a metal mainly composed of iron. Therefore, on the cut surfaces of the feedthrough 160, it plates the exposed surfaces of the header 601 and the pins 602. It is necessary to form a plated layer on the side surface of the header 601. The plating on this part may have been preliminarily made to the tube 711 of the columnar body 701 before cutting out the feedthrough 160, or may be made at the same time as the plating of the cut surfaces after cutting out the feedthrough 160.

The header 601 and pins 602 may be plated at the same time. It may be desirable to plate these surfaces with the same metallic material. The plating metal may be nickel, which has higher corrosion resistance, more excellent solder wettability, and easy processability for plating. Since the pins 602 are not necessary to be inserted in or taken out of the holes in a female connector, they may obtain sufficient contact properties by nickel plating. Since feedthroughs 160 are cut out from the columnar body 701, the cross-sections of the feedthroughs 160 in the direction of axes of the pins 602 are always the same. Since the plated layers on the cut surfaces are thin, it may be regarded that the end surfaces of the header 601, pins 602, and the insulating sealant 603 are flush.

Figure 8:
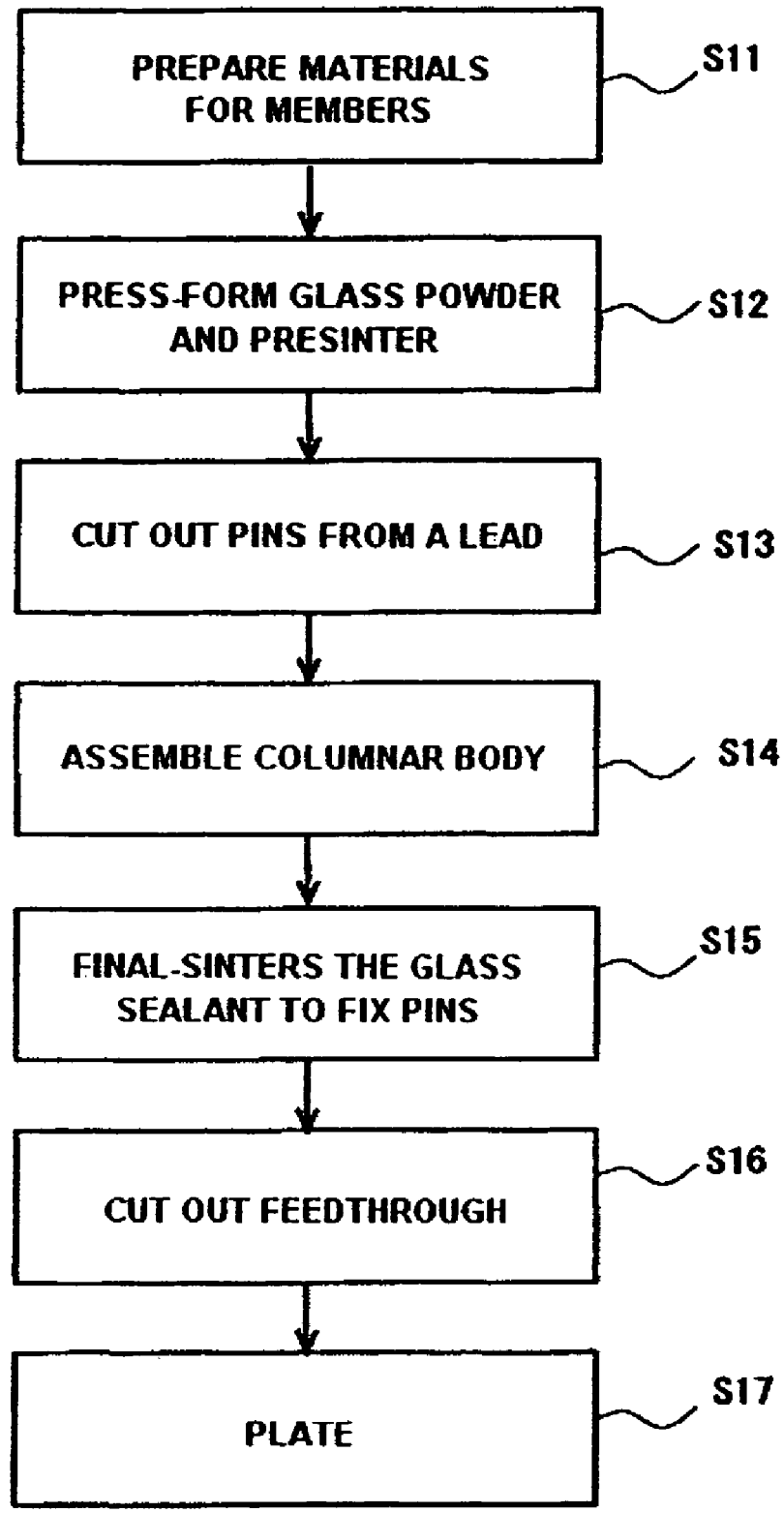
FIG. 8 is an exemplary flowchart illustrating a manufacturing method of a feedthrough in an embodiment.

Next, referring to the flowchart of FIG. 8, an example of a manufacturing method of a feedthrough 160 including manufacturing a columnar body 701 is shown. The manufacturing method of a columnar body 701 first prepares materials of the tube 711, pins 712, and the insulating sealant 713 (S11). In this example, glass is used as a material of,the insulating sealant 713. It press-forms glass powder and then presinters the press-formed workpiece (S12). The presintered glass body has an outer diameter a little smaller than the inner diameter of the tube 711 and has a plurality of through-holes a little larger than the pins 712 to be inserted. Furthermore, it cuts a long lead to manufacture the plurality of pins 712 (S13).

Then, the method assembles the manufactured tube 711, glass insulating sealant 713, and pins 712 into the columnar body 701 (S14). Specifically, preparing a jig of graphite, it sets the tube 711, the presintered glass insulating sealant 713, and the plurality of pins 712 into the jig. The glass insulating sealant 713 is inserted in the tube 711 and each pin 712 is inserted in each hole of the glass insulating sealant 713. Next, the glass insulating sealant 713 is final-sintered at a precisely controlled temperature within a precisely controlled atmosphere (S15). This achieves complete sealing of the inside of the tube 711 and securing the pins 712 in the glass insulating sealant 713. Thereby, the columnar body 701 is finished.

Next, the columnar body 701 is cut in the direction vertical to the axes of the pins 712 with a diamond cutter, for example, so that a feedthrough 160 with a specific thickness is cut out (S16). The surface of the cut out feedthrough 160 is plated as necessary (S17); the feedthrough 160 to be mounted in the HDD 1 is finished. In this way, manufacturing the columnar body 701 and cutting out a plurality of feedthroughs 160 from the columnar body 701 achieve extremely efficient manufacture of feedthroughs 160.

The manufacturing method of forming a columnar body and cutting out feedthroughs is more suitable for the feedthrough 160 of the second aspect than the feedthrough 130 of the first aspect. This is because the pins and the tube have certain lengths and it is not always easy to insert the sintered glass insulating sealant into a narrow and long space or to fill such a space with glass powder, so that they may cause the manufacturing efficiency to be reduced.

In the case that conductance is obtained by contacting other spring terminals to conductive pins like the present embodiment, such high accuracy in positions of the pins is not required as in the conventional type of connector in which pins are inserted and taken out. Accordingly, if a plurality of pins 602 are arranged in a single hole like the feedthrough 160, high accuracy is not required in positioning the pins during manufacture to improve manufacturing efficiency and yields. Although these are remarkably effective if all the pins 602 are inserted in a single hole like the feedthrough 160, the same effect may be obtained if a header has a plurality of holes and a plurality of pins are processed in each hole.

As set forth above, the present invention has been described by way of one embodiment, but it is not limited to the above-described embodiment. A person skilled in the art may easily modify and add each element in the above embodiment within the scope of the present invention. For example, while embodiments of the present invention are particularly useful to HDDs, embodiments may be applied to other types of disk drive devices. Moreover, while in certain embodiments the feedthrough may be configured to transmit the magnetic head signals, the driving power of the VCM, and the driving power of the SPM, in alternative embodiments the feedthrough may be configured to transmit only one or two of these.

What is claimed is:

1. A manufacturing method of a hermetic connection terminal used in a disk drive device having a hermetically sealed enclosure, the method comprising:
    putting an insulating sealant in a through-hole in a direction of an axis of a header which is made of a metal and is long in the axis direction;
    inserting a conductive pin into the hole in a direction where the hole extends;
    insulating and securing the conductive pin by the insulating sealant to form a columnar body; and
    cutting the columnar body in the direction crossing the axis direction of the conductive pin to cut out a plurality of hermetic connection terminals, wherein the level of a top end surface of the conductive pin is flush with the level of a top surface of the columnar body and the level of a bottom end surface of the conductive pin is flush with the level of a bottom surface of the columnar body.

2. The method according to claim 1, further comprising plating an outer surface of the hermetic connection terminal after cutting out the hermetic connection terminal.

3. The method according to claim 2, wherein the plating plates the header and the conductive pin with the same material.

4. The method according to claim 1, wherein the header includes at least two holes and an insulating sealant insulates and secures a conductive pin in each of the holes.

5. The method according to claim 1 wherein:
    the header is an annular body having only one hole; and
    a plurality of pins discrete from each other are insulated and secured by the insulating sealant in the hole.

6. A disk drive device comprising:
    a hermetically sealed enclosure;
    a disk mounted in the enclosure;
    a head for accessing the disk;
    a moving mechanism for supporting the head and moving the head above the disk;
    a hermetic connection terminal joined to the enclosure comprising:
        a header formed of a metal having a hole;
        an insulating sealant formed in the hole; and
        a conductive pin insulated and secured in the insulating sealant, wherein the level of a top end exposed surface of the conductive pin is flush with the level of a top surface of the columnar body and the level of a bottom end surface of the conductive pin is flush with the level of a bottom surface of the columnar body and cross-sectional shapes in the axis direction of the conductive pin being the same; and a connector having a spring terminal in contact with either of the exposed surfaces of the conductive pin.

7. The disk drive device according to claim 6, wherein a plurality of pins insulated from each other by the insulating sealant are secured in a single hole of the header.

8. The disk drive device according to claim 6, wherein the header is an annular body having only one hole; and a plurality of pins discrete from each other are insulated and secured by the insulating sealant in the hole.

9. The disk drive device according to claim 6, wherein the header and the conductive pin are plated with the same material.

* * * * *